United States Patent
Harwood et al.

(10) Patent No.: US 9,655,451 B2
(45) Date of Patent: *May 23, 2017

(54) RESTRICTED ROCKER SPRING ASSEMBLY

(71) Applicant: La-Z-Boy Incorporated, Monroe, MI (US)

(72) Inventors: Eric B. Harwood, Toledo, OH (US); Larry P. LaPointe, Temperance, MI (US)

(73) Assignee: La-Z-Boy Incorporated, Monroe, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/068,998

(22) Filed: Mar. 14, 2016

(65) Prior Publication Data
US 2016/0192779 A1 Jul. 7, 2016

Related U.S. Application Data

(63) Continuation of application No. 13/782,835, filed on Mar. 1, 2013, now Pat. No. 9,314,101.

(51) Int. Cl.
*A47C 3/027* (2006.01)
*A47C 3/025* (2006.01)
*F16F 3/04* (2006.01)

(52) U.S. Cl.
CPC .......... *A47C 3/0252* (2013.01); *A47C 3/027* (2013.01); *F16F 3/04* (2013.01)

(58) Field of Classification Search
CPC .... F16F 1/12; F16F 1/121; F16F 1/122; F16F 1/128; A47C 3/02; A47C 3/025; A47C 3/0252; A47C 3/027; A47C 3/029

(Continued)

(56) References Cited

U.S. PATENT DOCUMENTS

| 203,602 A | 5/1878 | Dietsch |
| 2,772,723 A | 12/1956 | Tunnell |

(Continued)

FOREIGN PATENT DOCUMENTS

| EP | 1504697 A1 | 2/2005 |
| KR | 1020060036132 | 4/2006 |
| KR | 100807370 B1 | 2/2008 |

OTHER PUBLICATIONS

Written Opinion of the International Searching Authority for PCT/US2014/019455 mailed May 26, 2014.

(Continued)

*Primary Examiner* — Thomas J Williams
*Assistant Examiner* — Mariano Sy
(74) *Attorney, Agent, or Firm* — Harness, Dickey & Pierce, P.L.C.

(57) ABSTRACT

A furniture member rocker spring assembly includes first and second bracket members arranged in mirror image configuration. First and second springs are positioned between and in direct contact with each of the first and second bracket members. A restrictor bolt assembly is positioned intermediately between the first and second springs. The restrictor bolt assembly includes at least one sleeve member received in an aperture of the first and second bracket members and a fastener that extends through a sleeve bore in the sleeve member. The sleeve member is arranged in sliding contact with at least one of the first and second bracket members.

20 Claims, 9 Drawing Sheets

(58) Field of Classification Search
USPC ....... 267/131, 133, 166, 167, 169, 170, 178,
267/179; 297/258.1, 264.1, 265.1, 266.1,
297/267.1
See application file for complete search history.

(56) References Cited

U.S. PATENT DOCUMENTS

| | | | |
|---|---|---|---|
| 4,662,597 A * | 5/1987 | Uecker | B60N 2/504 |
| | | | 248/419 |
| 5,171,000 A | 12/1992 | LaPointe et al. | |
| 5,435,622 A | 7/1995 | Fay et al. | |
| 5,567,009 A | 10/1996 | Fay et al. | |
| 5,570,930 A | 11/1996 | LaPointe et al. | |
| 5,806,921 A | 9/1998 | LaPointe et al. | |
| 6,827,401 B2 | 12/2004 | Marshall et al. | |
| 7,275,789 B2 | 10/2007 | LaPointe | |
| 9,314,101 B2 * | 4/2016 | Harwood | A47C 3/027 |
| 2007/0085395 A1 | 4/2007 | LaPointe | |

OTHER PUBLICATIONS

International Search Report for PCT/2014/019455 mailed May 26, 2014.

* cited by examiner

RESTRICTED ROCKER SPRING ASSEMBLY

CROSS-REFERENCE TO RELATED APPLICATIONS

This application is a continuation of U.S. patent application Ser. No. 13/782,835 filed on Mar. 1, 2013, which is incorporated herein by reference in its entirety.

FIELD

The present disclosure relates to rocker springs and rocker spring assemblies used in furniture members.

BACKGROUND

This section provides background information related to the present disclosure which is not necessarily prior art.

Known rocker spring assemblies for furniture members have either one or two coiled springs that are captured between bracket members, one of the bracket members is mounted to a furniture member support frame. The other of the bracket members is mounted to a furniture member body. During rocking motion of the furniture member one of the springs is extended with respect to the other spring. A biasing force of the extended spring helps to return the furniture member to a neutral position ready for rocking in either of a forward or rearward rocking direction.

Known rocker spring assemblies such as that presented in U.S. Pat. No. 5,567,009 to Fay et al. discloses two limit rods. The limit rods are each positioned outside of both of the springs and have stop members formed on the ends of the rods, for example by a stamping operation, after the stop members are positioned between the bracket members. Stamping the rods after installation requires a forming operating be performed on the entire assembly, and the use of metal limit rod material can result in frictional noise.

SUMMARY

This section provides a general summary of the disclosure, and is not a comprehensive disclosure of its full scope or all of its features.

According to several aspects, a furniture member rocker spring assembly includes first and second bracket members. At least one spring is positioned between and in direct contact with each of the first and second bracket members. A restrictor bolt assembly extends through each of the first and second bracket members. The restrictor bolt assembly includes at least one sleeve member received in an aperture of and in sliding contact with the first and second bracket members. A fastener is received through a sleeve bore of the at least one sleeve member.

According to other aspects, a furniture member rocker spring assembly includes first and second bracket members arranged in mirror image configuration. First and second springs are positioned between and in direct contact with each of the first and second bracket members. A restrictor bolt assembly is positioned between the first and second springs. The restrictor bolt assembly includes first and second sleeve members individually received in an aperture of one of the first or second bracket members. The first and second sleeve members are in sliding contact with the first and second bracket members. A fastener extends through a sleeve bore of each of the first and second sleeve members. The fastener retains the first sleeve member in contact with the second sleeve member.

According to further aspects, a furniture member rocker spring assembly includes first and second bracket members arranged in mirror image configuration. The first bracket member is connected to a rocker member of a rocking furniture member and the second bracket member is connected to a seat support frame of the rocking furniture member. First and second springs are positioned between and in direct contact with each of the first and second bracket members. A restrictor bolt assembly is positioned between the first and second springs and includes first and second sleeve members individually received in sliding contact with an aperture of one of the first or second bracket members. A fastener extends through a sleeve bore of each of the first and second sleeve members. The fastener retains the first sleeve member in contact with the second sleeve member. A flared end of each of the first and second sleeve members has a diameter larger than a diameter of the aperture of the first and second bracket members.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
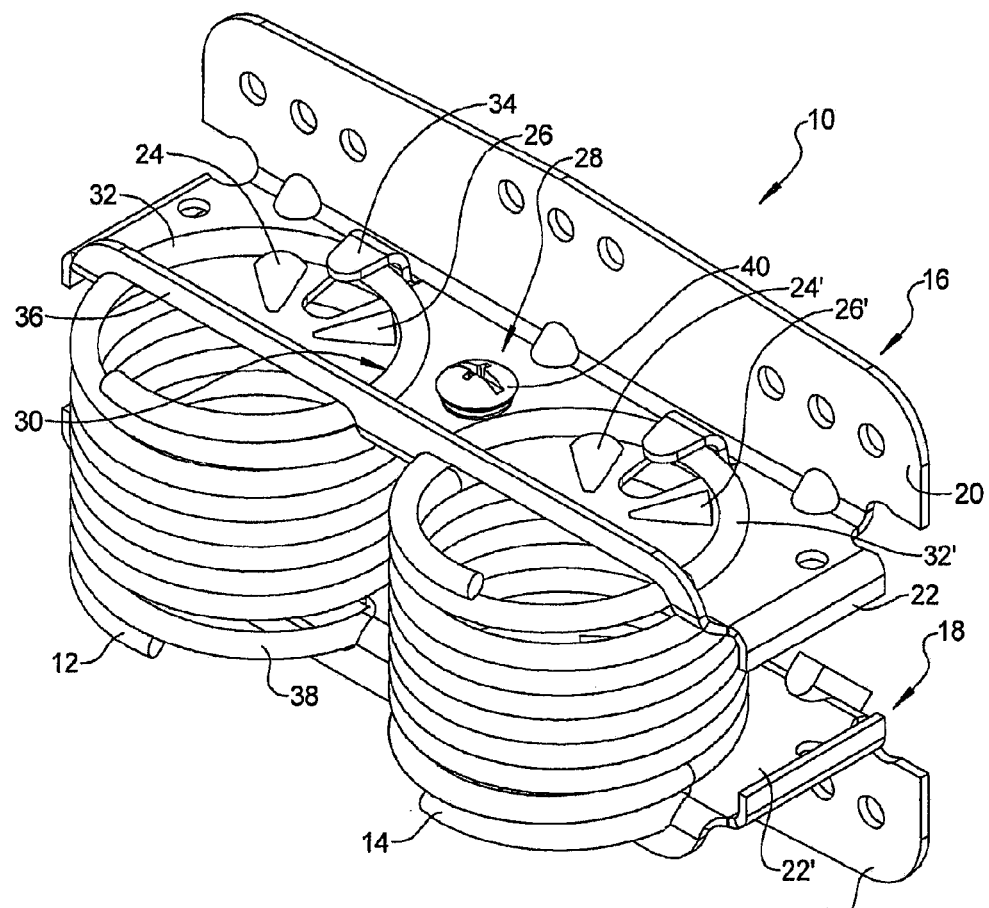
FIG. 1 is a front left perspective view of a rocker spring assembly of the present disclosure.

Referring to FIG. 1, a rocker spring assembly 10 includes a first coiled spring 12 positioned proximate to a parallel second coiled spring 14. Each of the first and second coiled springs 12, 14 are mounted to a first bracket member 16 and an oppositely arranged second bracket member 18. The first and second bracket members are substantially identical and configured in mirror image configuration; therefore, the following discussion of the first bracket member 16 applies equally to the second bracket member 18.

The first bracket member 16 includes a first mounting flange 20 which is oriented substantially normal with respect to a second mounting flange 22. The second bracket member 18 similarly includes a second mounting flange 20' and a second support flange 22'. Each of the first and second coiled springs 12, 14 are retained in position with respect to the first support flange 22 using raised alignment members. These include for each of the first and second coiled springs 12, 14 a first raised alignment member 24 and a second raised alignment member 26 which can be formed by stamping or drawing material of the first support flange 22 in an upward direction as shown with respect to FIG. 1. Each of the first and second raised alignment members 24, 26 (third and fourth raised alignment members 24', 26' are provided for second coiled spring 14) are generally triangular shaped with a raised end raised with respect to an outer facing surface 28 which can directly contact and therefore align an inner perimeter edge 30 of each of the first and second coiled springs 12, 14.

Each of the first and second raised alignment members 24, 26 contact only the inner perimeter edge 30 of a first end coil member of each of the first and second coiled springs 12, 14. The first end coil member 32 is separated from the remaining coil members and therefore is positioned in direct contact with the outer facing surface 28 of first support flange 22. In addition to the first and second raised alignment members 24, 26 being in direct contact with the first end coil member 32, the first support flange 22 also provides a tab 34 which integrally extends from first support flange 22 and partially encircles the first end coil member 32 to act as a positive engagement member, thereby restraining the first end coil member 32. As a second positive restraint of the first end coil member 32, a restraining bar 36 formed of the same material of first support flange 22 also assists in capturing the first end coil member 32. A second end coil member 38 of each of the first and second coiled springs 12, 14 is similarly captured and restrained by the second support flange 22' of second bracket member 18.

To positively couple the first and second bracket members 16, 18 of rocker spring assembly 10, a single restrictor member in the form of a restrictor bolt assembly 40 is used. Restrictor bolt assembly 40 is centrally positioned between each of the first and second coiled springs 12, 14 and extends through axially aligned apertures created in each of the first support flange 22 and second support flange 22', as will be described in greater detail in reference to FIG. 2.

Referring to FIG. 2 and again to FIG. 1, the restrictor bolt assembly 40 includes a first sleeve member 42 which is slidably received through first support flange 22, and a second sleeve member 44 which is slidably received through second support flange 22'. The first and second sleeve members 42, 44 are aligned coaxial to each other and directly contact each other, defining a sleeve contact joint 46. The first and second coiled springs 12, 14 are shown in a fully compressed condition; therefore, a portion of second sleeve member 44 extends beyond second support flange 22' to allow for displacement between first and second support flanges 22, 22' as the first and second coiled springs 12, 14 expand toward their fully extended condition during operation. A fastener nut such as a stub fastener 48 is received at a free end of second sleeve member 44, which stops travel of the second support flange 22' away from the first support flange 22 thereby defining a maximum extension limit of the first and second coiled springs 12, 14.

Figure 2:
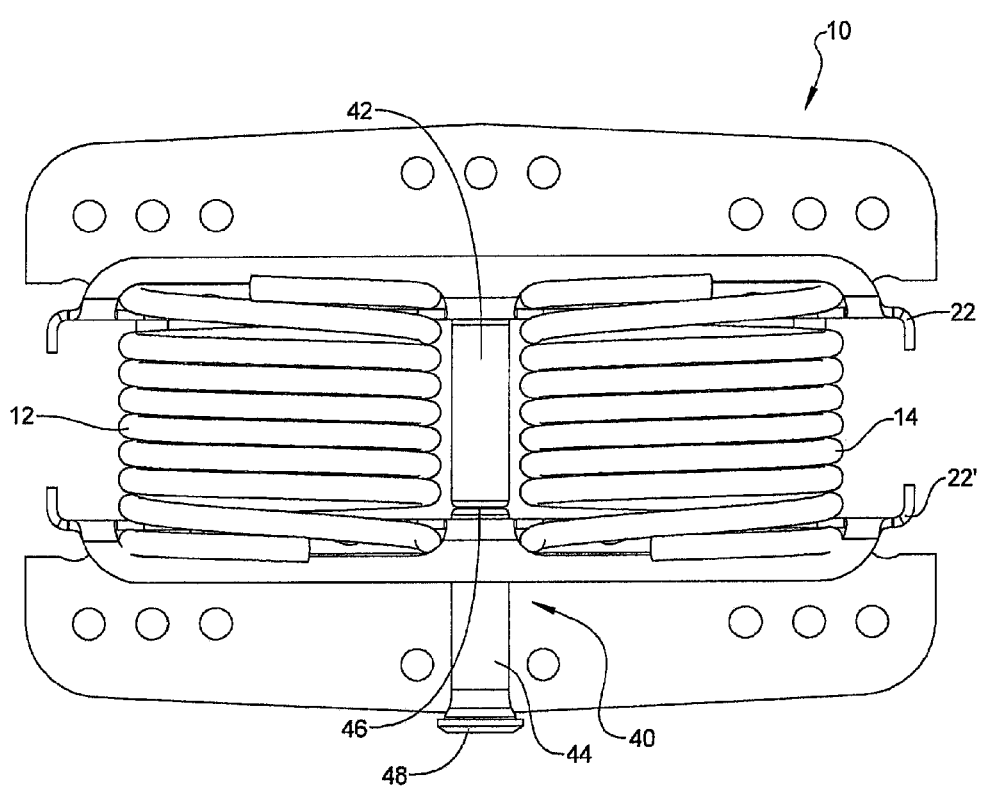
FIG. 2 is a front elevational view of the rocker spring assembly of FIG. 1.

Referring to FIG. 3 and again to FIGS. 1 and 2, the restrictor bolt assembly 40 is positioned at an equally spaced position between each of the first and second coiled springs 12, 14. A spring spacing "$A_1$" between a longitudinal centerline of first coiled spring 12 and the longitudinal centerline of restrictor bolt assembly 40 is substantially equal to a spring spacing "$A_2$" between the centerline of restrictor bolt assembly 40 and an axial centerline of second coiled spring 14.

Referring to FIG. 4 and again to FIG. 3, the first and second sleeve members 42, 44 of restrictor bolt assembly 40 are assembled by insertion of a threaded screw as a fastener 50 having a threaded shank 52 slidably received through each of a first sleeve bore 54 of the first sleeve member 42 and subsequently through a second sleeve bore 56 of the second sleeve member 44. An engagement end 58 of the threaded shank 52 is threadably engaged with a threaded bore 60 created in the stub fastener 48. When assembled, a barrel portion 61 of the stub fastener 48 is slidably received in an inner bore 62 of the second sleeve member 44.

The first sleeve member 42 is slidably received in a first assembly aperture 64 of first support flange 22 having a diameter "$D_1$". To prevent the pullout of first sleeve member 42 with respect to first support flange 22, a first flared end 66 is created in first sleeve member 42 which has a diameter "$D_2$" larger than diameter "$D_1$" of first assembly aperture 64. A screw head 68 of threaded screw 50 also has a diameter "$D_3$" substantially equal to or greater than diameter "$D_2$" of the first flared end 66. The first flared end 66 provides positive contact with first support flange 22, preventing displacement of first sleeve member 42 through first assembly aperture 64 in a downward direction as viewed with respect to FIG. 4. Similarly, the second sleeve member 44 is slidably received in a second assembly aperture 70 of second support flange 22' also having diameter "$D_1$". A second flared end 72 is created in second sleeve member 44 which has a diameter "$D_2$" larger than diameter "$D_1$" of second assembly aperture 70. The stub fastener 48 also has a diameter "$D_4$" larger than the diameter "$D_1$" of second assembly aperture 70. The second flared end 72 provides positive contact with second support flange 22', preventing displacement of second sleeve member 44 through second assembly aperture 70 in an upward direction as viewed with respect to FIG. 4.

Together, the stub fastener 48 and the second flared end 72 prevent the sliding release or pullout of second sleeve member 44 with respect to second assembly aperture 70. In the configuration shown in FIG. 4, the first and second coiled springs 12, 14 are shown in a fully compressed condition. As the first and second coiled springs 12, 14 expand during use, the second support flange 22' will displace downwardly, as viewed with respect to FIG. 4 with respect to the first support flange 22, until the maximum extent of extension is reached when the first flared end 66 contacts first support flange 22 and the second flared end 72 contacts second support flange 22'. As previously noted, each of the first and second assembly apertures 64, 70 have diameter "$D_1$" which is larger than a diameter "$D_5$" of the first and second sleeve members 42, 44, allowing sliding displacement of the first and second sleeve members 42, 44 within the first and second assembly apertures 64, 70.

Figure 4:
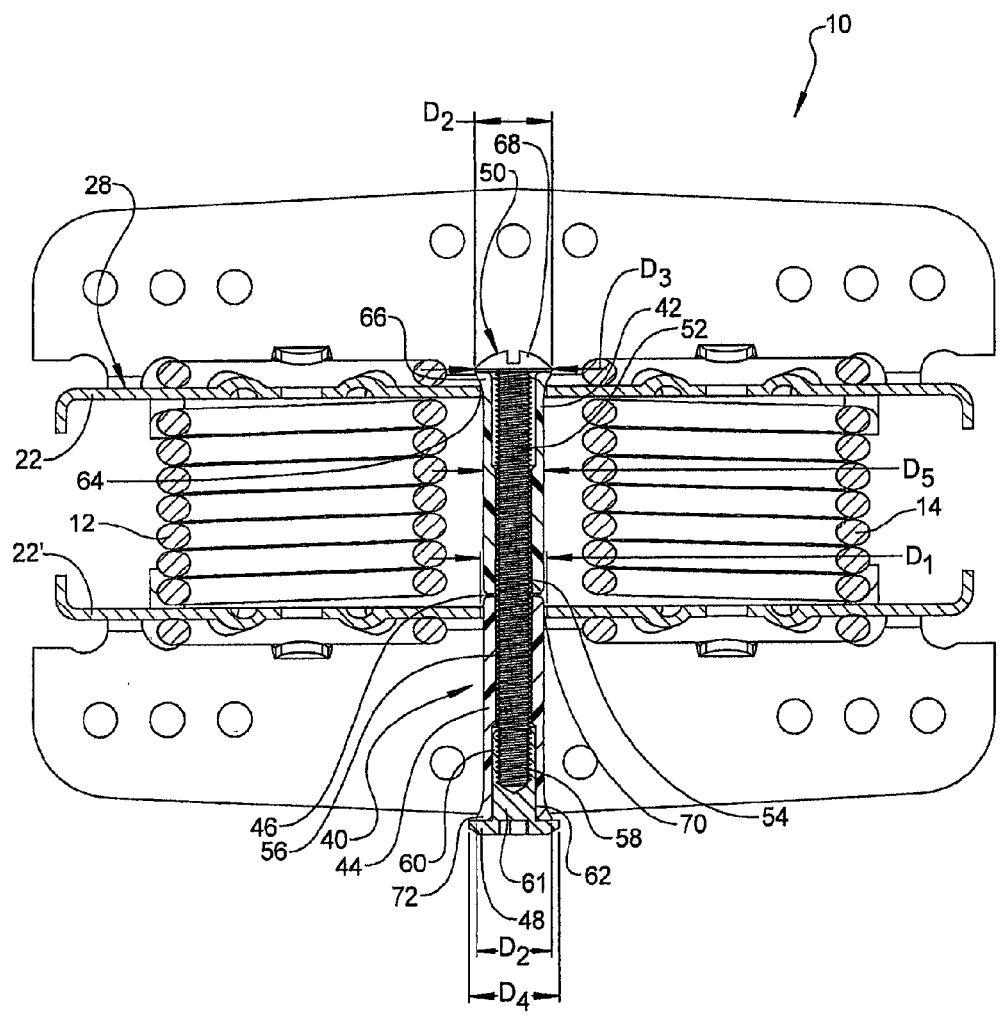
FIG. 4 is a cross sectional front elevational view taken at section 4 of FIG. 3.

Referring to FIG. 5 and again to FIG. 4, a restrictor bolt working length "B" is defined between the first and second flared ends 66, 72. The restrictor bolt working length "B" defines a maximum displacement distance permitted between the first and second support flanges 22, 22'. A support flange spacing "C" can vary between a minimum when the first and second coiled springs are fully compressed to a maximum when flared ends 66,72 contact first and second support flanges 22, 22'. At the minimum support flange spacing "C" shown and at all support flange spacings "C" the sleeve contact joint 46 is always positioned freely away from either the first or second support flange 22, 22' such that the sleeve contact joint 46 cannot enter either of the first or second assembly apertures 64, 70 and therefore bind within either of the apertures.

Figure 3:
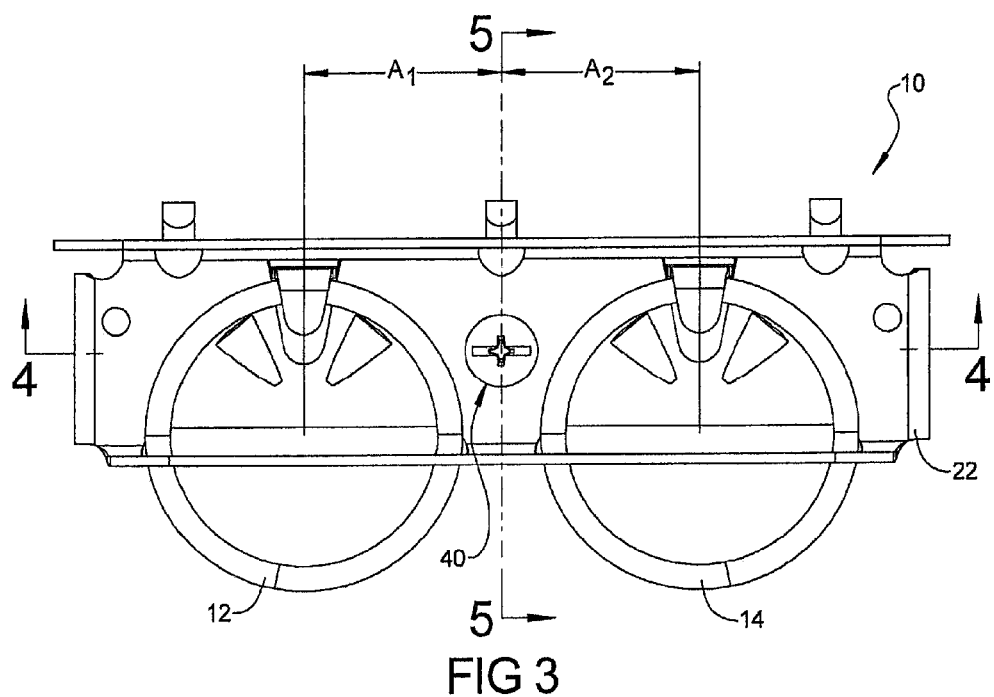
FIG. 3 is a top plan view of the rocker spring assembly of FIG. 1.
Figure 5:
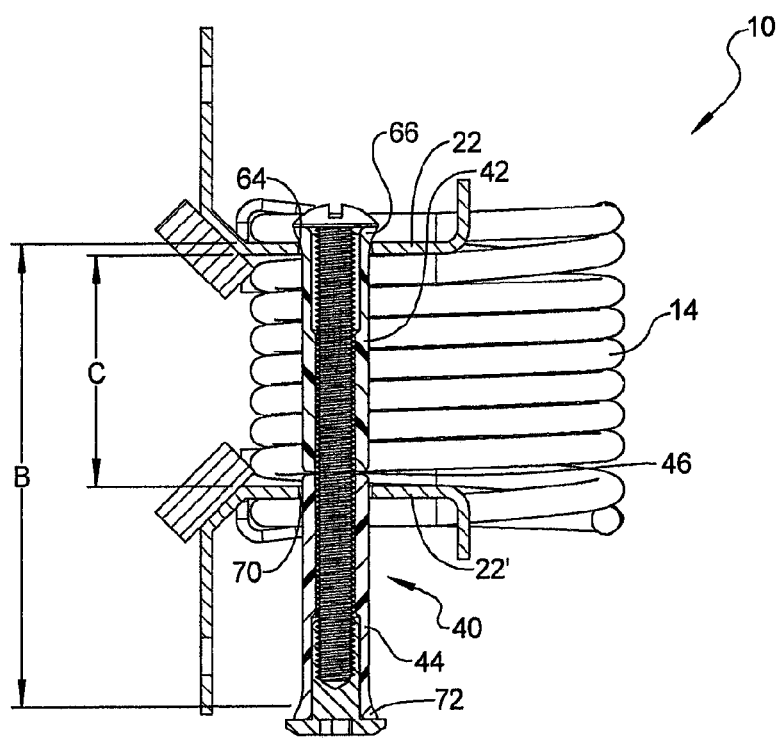
FIG. 5 is a cross sectional end elevational view taken at section 5 of FIG. 3.
Figure 6:
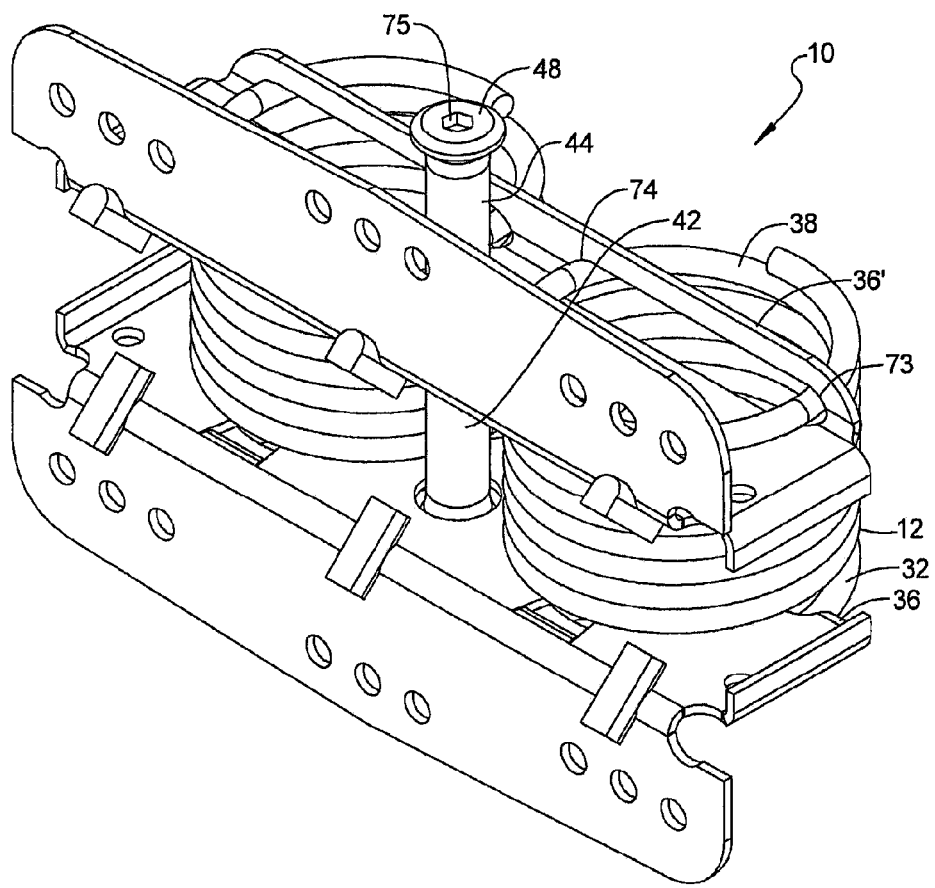
FIG. 6 is a rear right perspective view of the rocker spring assembly of FIG. 1.

Referring to FIG. 6 and again to FIGS. 3-5, each of the restraining bars 36, 36' can further include opposed first and second slot ends 73, 74 in two locations, each corresponding to direct contact locations between the restraining bars 36, 36' and the first and second end coil members 32, 38, of the first and second coiled springs 12, 14 respectively. The first and second slot ends 73, 74 are spaced from each other at a distance which is less than an outer diameter of the first and second end coil members 32, 38 to frictionally restrain the first and second coiled springs 12, 14. The stub fastener 48 can also be provided with an Allen wrench socket 75 or a similar engagement device providing for positive engagement by a tool when the opposite end or screw head 68 of threaded screw 50 is being tightened.

Referring to FIG. 7 and again to FIGS. 1-6, an exemplary one of two rocker spring assemblies 10, which are used to rotatably connect portions of a rocking furniture member 76 together, is shown. The rocking furniture member 76 is depicted as a rocking chair; however, the design of the rocking furniture member 76 is not limited to chairs and can also include sofa sections, ottomans, and the like. The rocking furniture member 76 can include a first arm 78 having a seat back assembly 80 which is rotatable with respect thereto. A seat pan 82 can be rotatably connected to the seat back assembly 80 such that the seat pan 82 can displace as the seat back assembly 80 rotates. Each of the seat back assembly 80 and the seat pan 82 are connected to the first arm 78. The first arm 78 is rotatably connected to a seat support frame 84 using rocker spring assembly 10. A rocker member 86 is fixed to an arm frame face 88 of the first arm 78, and the first support flange 22 of rocker spring assembly 10 is fixed to the rocker member 86.

The second support flange 22' of rocker spring assembly 10 is fixed to the seat support frame 84. The rocker member 86 includes a convex curved surface 90 which is positioned in contact with a planar face 92 which is upwardly directed from the seat support frame 84. A rocking motion of the rocking furniture member 76 is therefore permitted by contact between convex curved surface 90 and the planar face 92, with the first and second coiled springs 12, 14 acting as rotation biasing members. The restrictor bolt assembly 40 positioned between the first and second coiled springs 12, 14 acts as the limiter for maximum spacing between the first and second support flanges 22, 22', and therefore limiting extension of the first and second coiled springs 12, 14 during the rocking motion. The seat support frame 84 is supported on a floor surface 94 which is commonly planar to provide stable support for the seat support frame 84 during the rocking motions of rocking furniture member 76.

Figure 7:
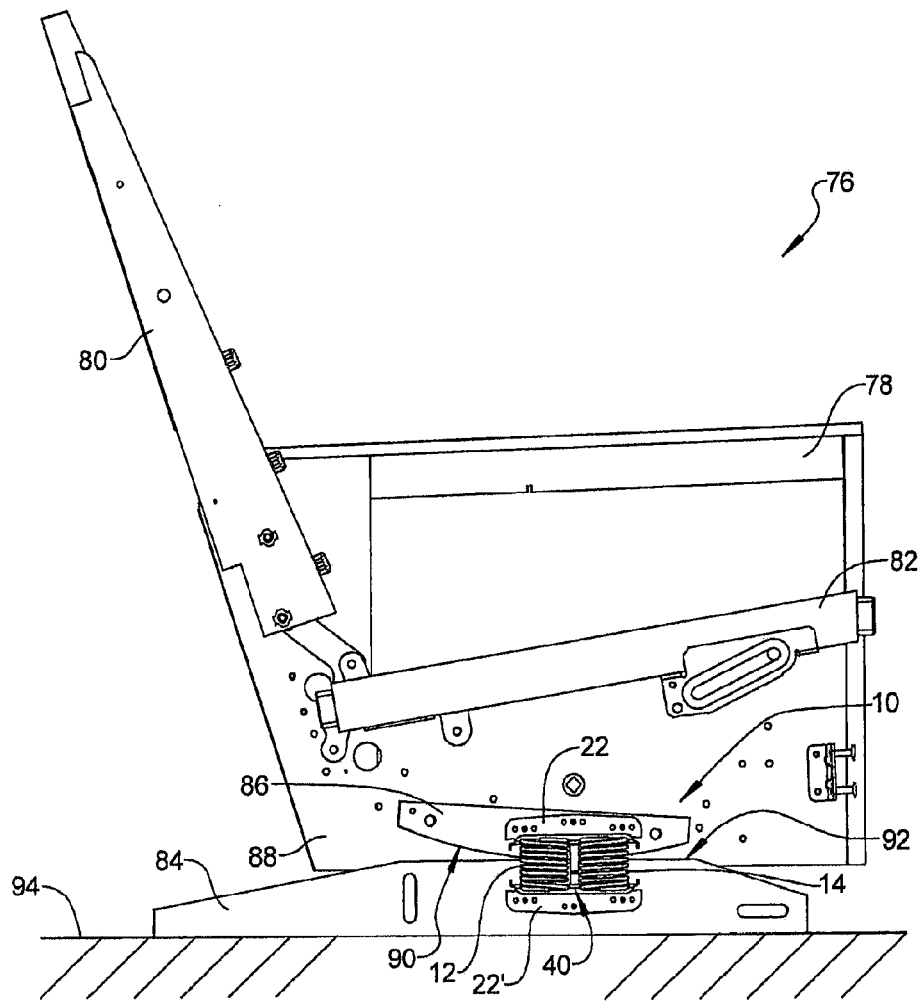
FIG. 7 is a partial side elevational view of a furniture member having a rocker spring assembly of FIG. 1.
Figure 8:
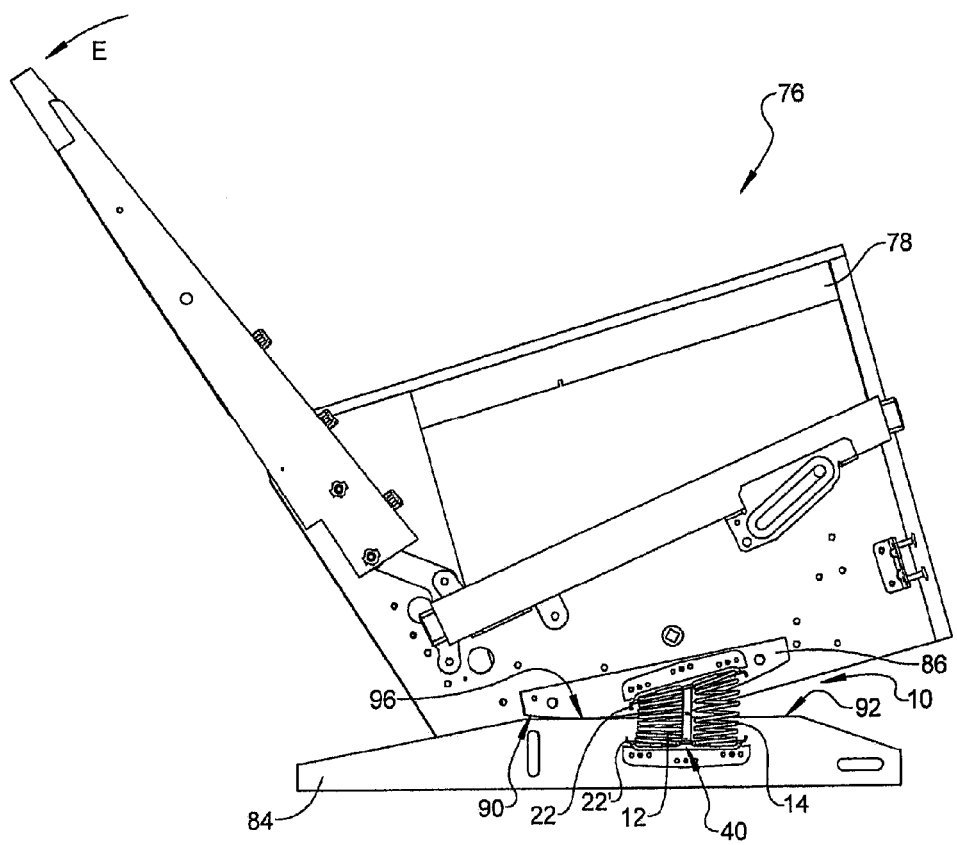
FIG. 8 is a partial side elevational view of the furniture member of FIG. 7 in a rear rocked position.

Referring to FIG. 8 and again to FIG. 7, the rocking furniture member first arm 78 and seat back member 80 are shown in a furthest rearward rocked position in a rearward rocking direction "E" by rotation of first support flange 22 with respect to seat support frame 84. At this position, a rocking contact point 96 is created between the convex curved surface 90 of rocker member 86 and the planar face 92 of seat support frame 84. The position of rocking contact point 96 is rearward of the position of restrictor bolt assembly 40. This spacing difference between rocking contact point 96 and the position of restrictor bolt assembly 40 provides for a maximum extension of second coiled spring 14 and a less-than-maximum extension of first coiled spring 12. The restrictor bolt assembly 40 acts to provide a limiter for the displacement between first support flange 22 and second support flange 22' of rocker spring assembly 10. In an oppositely rotated position of the rocking furniture member 76 defining a forward rocked position, the first coiled spring 12 can be extended to its maximum extent while the second coiled spring 14 is extended to less than its maximum extent, using the restrictor bolt assembly 40 to limit the maximum displacement between the first and second support flanges 22, 22'.

Figure 9:
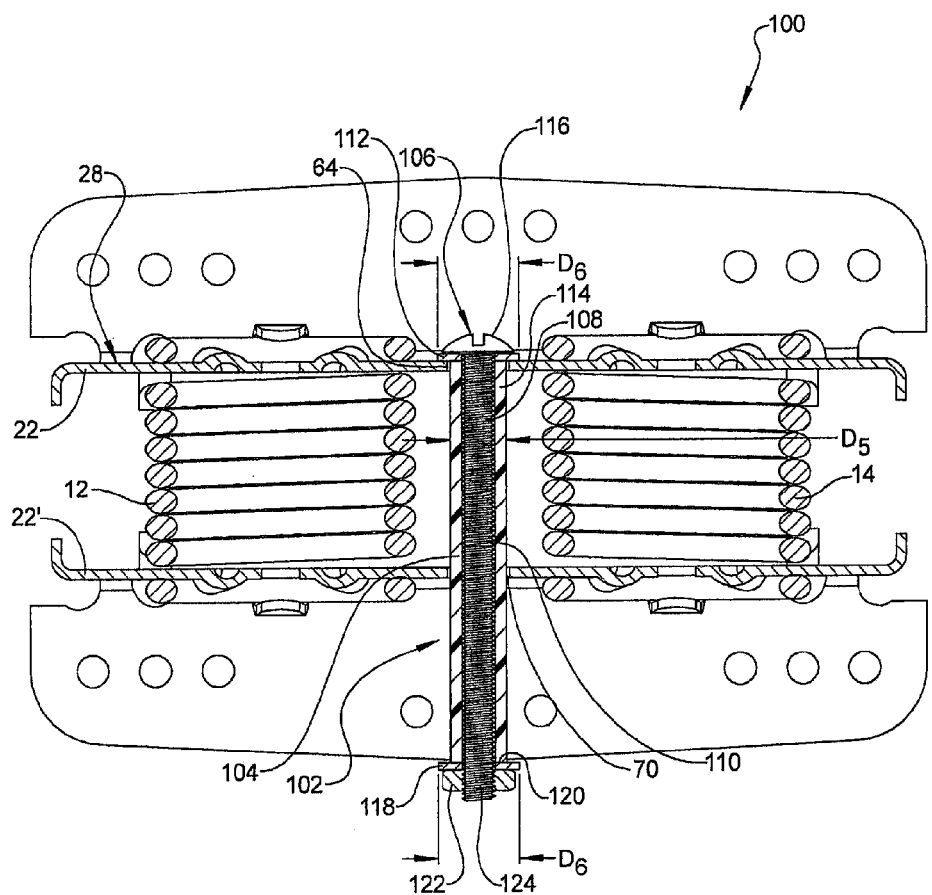
FIG. 9 is a cross sectional front elevational view similar to FIG. 4 of another aspect of a rocker spring assembly.

Referring to FIG. 9 and again to FIGS. 1-8, a rocker spring assembly 100 can be directly substituted for rocker spring assembly 10. Rocker spring assembly 100 includes many of the same components as rocker spring assembly 10 and is differentiated by the use of a restrictor bolt assembly 102 instead of restrictor bolt assembly 40. Restrictor bolt assembly 102 includes a single sleeve member 104 made of a polymeric material that is slidingly received in both the first and second assembly apertures 64, 70. Sleeve 104 has a diameter "$D_5$" similar to first and second sleeve members 42, 44. A fastener 106 has a threaded shank 108 extending entirely through a bore 110 of the sleeve 104. A first washer 112 is positioned in direct contact at a free end 114 of sleeve 104. First washer 112 has a diameter "$D_6$" which is larger than the diameter "$D_1$" of first and second assembly apertures 64, 70. A fastener head 116 of fastener 106 contacts first washer 112. A second washer 118 is positioned in direct contact at a free end 120 of sleeve 104. Second washer 118 also has diameter "$D_6$" which is larger than the diameter "$D_1$" of first and second assembly apertures 64, 70.

A fastener nut 122 is threadably engaged with a threaded end 124 of fastener 106, with fastener nut 122 in direct contact with second washer 118. The first and second washers 112, 118 provide positive travel stops for rocker spring assembly 100, defining the maximum displacement distance between first and second support flanges 22, 22'. Because first and second washers 112, 118 take the place of the first and second flared ends 66, 72 of restrictor bolt assembly 40, the first and second washers 112, 118 are also made of a polymeric material to prevent any metal portion of fastener 106 or fastener nut 122 from contacting the first or second support flanges 22, 22' of the first or second bracket members 16, 18.

According to several aspects, a furniture member rocker spring assembly 10, 100 includes first and second bracket members 16, 18. At least one spring 12, 14 is positioned between and in direct contact with each of the first and second bracket members 16, 18. A restrictor bolt assembly 40, 102 extends through each of the first and second bracket members 16, 18. The restrictor bolt assembly includes at least one sleeve member 42, 44 or 104 received in an aperture 64, 70 of and in sliding contact with the first and second bracket members 16, 18. A fastener 50, 106 is received through a sleeve bore 54, 56 or 110 of the at least one sleeve member 42, 44 or 104.

According to other aspects, a furniture member rocker spring assembly 10, 100 includes first and second bracket members 16, 18 arranged in mirror image configuration. First and second springs 12, 14 are positioned between and in direct contact with each of the first and second bracket members 16, 18. A restrictor bolt assembly 40, 102 is positioned between the first and second springs 12, 14. The restrictor bolt assembly 40, 102 includes at least one sleeve member 42, 44 or 104 received in an aperture 64, 70 of the first and second bracket members 16, 18. The sleeve member 42, 44 or 104 is in sliding contact with the first and second bracket members 16, 18. A fastener 50, 106 extends through a sleeve bore 54, 56 or 110 of each of the first and second sleeve members 42, 44 or 104. The fastener 50, 106 retains the first sleeve member in contact with the second sleeve member.

Restrictor bolt assemblies 40 used with rocker spring assemblies 10, 100 and restrictor bolt assemblies 102 used with rocker spring assemblies 100 offer several advantages. These include having the restrictor bolt assembly 40, 102 positioned directly between the first and second coiled springs 12, 14. This central positioning of restrictor bolt assembly 40, 102 allows either one of the first or second coiled springs 12, 14 to extend to a maximum extent while the second of the coiled springs reaches less than its maximum extended position. The central location of restrictor bolt assembly 40, 102 also balances the operating forces between first and second support flanges 22, 22' during rotation of the rocker spring assembly 10, 100. Further, the design of the first and second sleeve members 42, 44 having a common single threaded screw 50 extending through both the first and second sleeve members 42, 44, and/or the single sleeve member 104 having fastener 106 extending through single sleeve 104 provides assemblies that can be mechanically fastened at the time of construction of rocker spring assembly 10, 100 providing a simpler operation than a staking or pressing operation previously required to lock the restraining bolt of known rocker spring assemblies. In addition, the material of first and second sleeve members 42, 44 or 104 is a polymeric material which is selected to mitigate against the first and second sleeve members 42, 44 or 104 and/or the threaded screw 50, 106 from defining a noise-generating portion of the rocker spring assembly 10, 100. The polymeric material of the first and second sleeve members 42, 44 or 104 has a low coefficient of friction allowing free sliding displacement during operation, while preventing metal-to-metal contact which could cause squeaking noise.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A furniture member rocker spring assembly, comprising:
   first and second bracket members arranged in mirror image configuration, the first bracket member connected to a rocker member of a rocking furniture member and the second bracket member connected to a seat support frame of the rocking furniture member;
   first and second springs each extending between and directly contacting the first and second bracket members, the first and second springs being spaced apart from each other and defining an intermediate region that extends between the first and second springs; and
   a single restrictor bolt assembly positioned between the first and second springs, the single restrictor bolt assembly including:

at least one sleeve member received in sliding contact with an aperture in the first bracket member; and an elongated fastener extending through a sleeve bore of the at least one sleeve member, the elongated fastener extending between the first and second bracket members at a position located in the intermediate region defined between the first and second springs.

2. The furniture member rocker spring assembly of claim 1, wherein each of the first and second springs has a longitudinal centerline and the single restrictor bolt assembly has a longitudinal centerline that is spaced equidistant from the longitudinal centerlines of the first and second springs.

3. The furniture member rocker spring assembly of claim 2, wherein each of the first and second bracket members includes a first mounting flange and a second mounting flange, the first mounting flange oriented substantially normal to the second mounting flange, and the second mounting flange contacting the first and second springs.

4. The furniture member rocker spring assembly of claim 3, wherein the longitudinal centerlines of the first and second springs are parallel and extend in a common plane and wherein the longitudinal centerline of the single restrictor bolt assembly is parallel to the longitudinal centerlines of the first and second springs and is positioned between the first mounting flange of the first and second bracket members and the common plane defined by the longitudinal centerlines of the first and second springs.

5. The furniture member rocker spring assembly of claim 3, wherein the second mounting flange of the first bracket member includes an outer facing surface with raised alignment members that contact and position the first and second springs and wherein the single restrictor bolt assembly is positioned between the raised alignment members that contact the first spring and the raised alignment members that contact the second spring.

6. The furniture member rocker spring assembly of claim 3, wherein the longitudinal centerlines of the first and second springs extend in a common plane and wherein the longitudinal centerline of the single restrictor bolt assembly is positioned between the common plane and the first mounting flange of the first and second bracket members.

7. The furniture member rocker spring assembly of claim 1, wherein the at least one sleeve member includes a first sleeve member and a second sleeve member, the first and second sleeve members each has a flared end, and the elongated fastener includes a fastener head in contact with the flared end of the first sleeve member.

8. The furniture member rocker spring assembly of claim 7, wherein the first sleeve member is slidingly received in the aperture in the first bracket member and wherein the second bracket member includes an aperture that slidingly receives the second sleeve member.

9. The furniture member rocker spring assembly of claim 8, wherein a diameter of both of the first and second sleeves is less than a diameter of the apertures in the first and second bracket members to permit sliding motion of the first and second sleeves in the apertures of the first and second bracket members.

10. The furniture member rocker spring assembly of claim 9, wherein the flared ends of the first and second sleeve members have diameters that are larger than the diameter of the apertures in the first and second bracket members.

11. The furniture member rocker spring assembly of claim 7, wherein the flared ends are individually positioned at opposite outer facing surfaces of the first and second bracket members, the flared ends operably contacting the first and second bracket members at a maximum extended position of the first and second bracket members to limit a maximum displacement between the first bracket member and the second bracket member.

12. The furniture member rocker spring assembly of claim 7, wherein the first and second sleeve members are aligned coaxially to each other.

13. The furniture member rocker spring assembly of claim 7, wherein the elongated fastener includes a threaded end opposite the fastener head that threadably engages the second sleeve member.

14. The furniture member rocker spring assembly of claim 7, further comprising a stub fastener having a threaded bore engaging a threaded end of the elongated fastener, wherein the stub fastener includes a wrench socket that allows the stub fastener to be retained against rotation when the elongated fastener is rotated to engage the threaded end of the elongated fastener with the threaded bore of the stub fastener, and wherein a portion of the stub fastener is received in the second sleeve member.

15. The furniture member rocker spring assembly of claim 1, wherein the at least one sleeve member is a polymeric material that prevents metal-to-metal contact between the elongated fastener and the first and second bracket members.

16. The furniture member rocker spring assembly of claim 1, wherein the at least one sleeve member extends longitudinally beyond both of the first and second bracket members and prevents the elongated fastener from contacting the first and second bracket members in any position of the first and second bracket members.

17. The furniture member rocker spring assembly of claim 1, wherein a spacing between the restrictor bolt assembly and the first spring is equal to a spacing between the restrictor bolt assembly and the second spring.

18. A furniture member rocker spring assembly, comprising:
a first bracket member connected to a rocker member of a rocking furniture member;
a second bracket member connected to a seat support frame of the rocking furniture member, the second bracket member being spaced from and arranged in mirror image configuration with the first bracket member;
first and second springs each extending between and directly contacting the first and second bracket members, the first and second springs being spaced apart from each other and defining an intermediate region that extends between the first and second springs; and
a single restrictor bolt assembly positioned intermediately between the first and second springs, the single restrictor bolt assembly including:
at least one sleeve member received in sliding contact with an aperture in one of the first or second bracket members; and
a fastener extending through a sleeve bore of the at least one sleeve member, the fastener extending between the first and second bracket members at a position located in the intermediate region between the first and second springs.

19. The furniture member rocker spring assembly of claim 18, wherein each of the first and second springs has a longitudinal centerline and the single restrictor bolt assembly has a longitudinal centerline that is spaced equidistant from the longitudinal centerlines of the first and second springs.

20. The furniture member rocker spring assembly of claim 19, wherein each of the first and second bracket members includes a first mounting flange and a second mounting flange, the second mounting flange extending perpendicularly from the first mounting flange, and the second mounting flange contacting the first and second springs.

\* \* \* \* \*